United States Patent
Lu et al.

(10) Patent No.: US 11,343,203 B2
(45) Date of Patent: May 24, 2022

(54) HIERARCHICAL SWITCHING FABRIC AND DEADLOCK AVOIDANCE METHOD FOR ULTRA HIGH RADIX NETWORK ROUTERS

(71) Applicant: NATIONAL UNIVERSITY OF DEFENSE TECHNOLOGY, Hunan (CN)

(72) Inventors: Kai Lu, Hunan (CN); Qiang Wang, Hunan (CN); Mingche Lai, Hunan (CN); Junsheng Chang, Hunan (CN); Pingjing Lu, Hunan (CN); Xingyun Qi, Hunan (CN); Yi Dai, Hunan (CN); Fangxu Lv, Hunan (CN); Jiaqing Xu, Hunan (CN); Jijun Cao, Hunan (CN); Canwen Xiao, Hunan (CN); Lu Liu, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 0 days.

(21) Appl. No.: 17/109,155

(22) Filed: Dec. 2, 2020

(65) Prior Publication Data
US 2021/0359958 A1    Nov. 18, 2021

(30) Foreign Application Priority Data
May 13, 2020  (CN) .......................... 202010402657.6

(51) Int. Cl.
*H04L 49/109* (2022.01)
*H04L 49/25* (2022.01)
*H04L 69/08* (2022.01)
*H04L 69/324* (2022.01)

(52) U.S. Cl.
CPC ............ *H04L 49/109* (2013.01); *H04L 49/25* (2013.01); *H04L 69/08* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 8,204,045 B2 * | 6/2012 | Berman | H04B 10/03 370/352 |
| 9,137,143 B2 * | 9/2015 | Parker | H04Q 11/0005 |
| 9,660,942 B2 * | 5/2017 | Kumar | H04L 43/0888 |

(Continued)

*Primary Examiner* — Jenkey Van
(74) *Attorney, Agent, or Firm* — JCIP Global Inc.

(57) ABSTRACT

This invention discloses a hierarchical switching fabric and deadlock avoidance method for ultra high radix network routers. The hierarchical switching fabric comprises a network-on-chip and K multi-port components. The multi-port component comprises a port module configured to receive packets by a high speed serializer/deserializer, code and format the packets, send the packets to a corresponding hyper packet module after coding and format conversion, and send the packets sent by the hyper packet module to the network; and the hyper packet module configured to perform protocol processing for the received data link level packets, discard illegal packets, forward legitimate packets to the network-on-chip, perform data error correcting, format conversion and channel mapping for the packets received from the network-on-chip, and send the packets to the corresponding port module.

12 Claims, 4 Drawing Sheets

(56) References Cited

U.S. PATENT DOCUMENTS

| | | | | |
|---|---|---|---|---|
| 2014/0043962 A1* | 2/2014 | Rangan | ............... | H04L 43/0852 |
| | | | | 370/252 |
| 2014/0211630 A1* | 7/2014 | Cavanna | ............. | H04L 43/0888 |
| | | | | 370/235 |
| 2017/0272381 A1* | 9/2017 | Li | ......................... | H04L 49/103 |
| 2017/0353401 A1* | 12/2017 | Kim | .................... | G06F 13/4221 |
| 2018/0183703 A1* | 6/2018 | Xiang | ................... | H04L 45/122 |
| 2020/0053002 A1* | 2/2020 | Heidelberger | ........ | H04L 49/552 |

\* cited by examiner

HIERARCHICAL SWITCHING FABRIC AND DEADLOCK AVOIDANCE METHOD FOR ULTRA HIGH RADIX NETWORK ROUTERS

CROSS-REFERENCE TO RELATED APPLICATION

This application claims the priority benefit of China application serial no. 202010402657.6, filed on May 13, 2020. The entirety of the above-mentioned patent application is hereby incorporated by reference herein and made a part of this specification.

BACKGROUND

Technical Field

This invention relates to interconnection chip technology, in particular to a hierarchical switching fabric for ultra high radix network routers and a deadlock avoidance method.

Description of Related Art

A high speed interconnection network is a core critical component of a high performance computing system, and also one of the most important factors that affect balanced expansion of performance and scale. Performance improvement of high performance computers is essentially realized by improving parallelism of the system. Development of processors slows down due to impact of Moore's law, and number of computing cores in an exascale high performance computing system will certainly increase exponentially, which will bring great challenges to the performance and power consumption of high performance interconnection networks. In the future, the interconnection power consumption budget of exascale computer systems is expected to be about 3-4 MW, with node injection rate of 400 Gbps, and network scale supports 100,000-200,000 nodes. The traditional high speed interconnection technology will not meet the requirements, and will face multiple challenges such as unbearable system cost and power consumption, and great difficulty in improving the interconnection network engineering density.

In order to obtain lower network delay in a high performance system interconnection network, the optimal radix k of routers in the network will increase with the development in the high performance computer technology, and k will continue to develop to higher order. At present, high radix router switch chip-based high performance interconnection networks have become the mainstream trend. The development of the interconnection chips to higher radix is the inevitable choice to realize low-power and high-density interconnection networks. Currently, the interconnection network technology continually develops with high speed serializer/deserializer (SerDes) rate as an intergenerational characteristic, which further increases the rate and quantity of SerDes integrated on the router on chip. In the future, it is a trend for the interconnection chips to develop to a higher radix. In 2013, XC series high speed networks of Cray Inc. were equipped with 48-port interconnection switch chip Aries, with single port rate up to 3 channels×14 Gbps. In 2014, the high speed interconnection network of Tianhe high performance computer was equipped with 24-port network router chip, and SerDes rate reached 14 Gbps, which was significantly improved, compared with 16 ports and 10 Gbps SerDes rate of Tianhe-1 network router chip. In 2015, Tianhe-2 upgraded a new generation of fully autonomous enhanced data rate (EDR) interconnection network with 48 ports. Menallox launched a 36-port EDR infinite bandwidth (InfiniBand) high speed network in 2015, and launched an HDR switch chip with up to 80 ports in 2019. IBM brought the high radix concept into full play, and researched an eagle network with single port 1 Lane×25 Gbps and 136 ports. Cray Inc. also configured Aries 48-port interconnection switch chip in the XC supercomputer network in 2016, and launched Slingshot interconnection chip again in 2020, with up to 64 ports and 12.8 Tbps aggregate bandwidth.

With the increase of the number of switching ports in ultra high radix network routers (NR), the switching ports occupy too much network resources, and face high switching delay and insufficient buffer resources, which may lead to chip deadlock. Therefore, how to face the hierarchical switching fabric of the ultra high radix network routers, and design a deadlock avoidance method for the hierarchical switching fabric to meet the needs of constructing the future interconnection network of low-cost, low-power consumption and high-density system, based on the mainstream trend of ultra high radix switch chip design in the system interconnection network, has become a key technical problem to be solved.

SUMMARY

A hierarchical switching fabric for ultra high radix network routers, comprises a network-on-chip (NOC) and K multi-port components configured to converge multiple switching ports; the multi-port component comprises a port module and a hyper packet module; the port module configured to receive packets from the NOC over a high speed serializer/deserializer (SerDes), encode and format the packets, send the packets to a corresponding hyper packet module (HP module) after coding and format conversion, and send the packets sent by the corresponding HP module to the NOC; and the HP module configured to perform protocol processing for the received data link level packets, discard illegal packets, forward legitimate packets to the NOC for switching, perform data error correcting, format conversion and channel mapping for the packets received from the NOC, and send the packets to the corresponding port module.

Alternatively, the port module comprises physical coding sublayer (PCS) submodules and M data link level protocol (LLP) submodules, the PCS submodules are connected with the NOC via the high speed SerDes, and are respectively connected with the HP modules via the M data LLP submodules, and the PCS submodules are configured to align and reorganize packet data, and the data LLP submodules are configured to perform packet format conversion and protocol processing.

Alternatively, the HP module comprises an ingress hyper packet logic (HP_Ingress) and an egress hyper packet logic (HP_Egress). The HP_Ingress comprises M identical port protocol processing logics, a first multiplexer element, a dynamic allocated multi-queue (DAMQ) element and a second multiplexer element. The port protocol processing logic comprises an HP element, a routing computing (RC) element, an error correcting code generator (ECC_GEN), and a first in first out (FIFO) queue buffer. The HP element and the RC are connected in parallel, and then connected with an input end of the FIFO queue buffer via the ECC_GEN. The packets from the port module are entered into the corresponding port protocol processing logic. The first multiplexer element selects the packets in each of the port protocol processing logics in turn and stores the packets in the DAMQ element, and the second multiplexer element is configured to output the packets stored in the DAMQ element to the NOC.

Alternatively, the HP_Egress comprises a data error correcting (DOC) element, a virtual channel to virtual channel (VC2VC) element, and M identical packet format gearboxes (GB). The packets from the NOC pass through the DOC element and the VC2VC element, and then output to the port module through the packet format GB.

Alternatively, the HP element comprises a packet checking (PC) logic, a partition key checking (PKC) logic and a sequence packet checking (SPC) logic successively connected.

Alternatively, the RC comprises a routing address computing logic, a routing address lookup logic, a routing address lookup logic, routing address error correcting logic and a routing mode selection logic successively connected.

Alternatively, the DAMQ element consists of 16-virtual channel shared buffer memories, and every two port protocol processing logics are set to share one 16-virtual channel shared buffer memory.

Alternatively, each DAMQ element comprises a tail slice DAMQ (TAIL DAMQ) configured to record whether a tail slice arrives and anomaly detection information upon arrival, a control DAMQ (CRTL DAMQ) configured to record head slice information and anomaly detection information (i.e. routing computing information) upon arrival of the head slice, and a data DAMQ (DATA DAMQ) configured to record data payload and ECC data protection information.

In addition, a deadlock avoidance method for the hierarchical switching fabric for ultra high radix network routers is also provided, and the implementation steps thereof are as follows:

1) a port module $PORT_u$ of a uth multi-port component receives packets from a network via a high speed serializer/deserializer (SerDes);

2) the port module $PORT_u$ encodes and converts format of the packets and sends the packets to a hyper packet (HP) module $HP_u$ of the uth multi-port component; and the HP module $HP_u$ performs protocol processing for received data link level packets, discards illegal packets, and forwards legitimate packets to a network-on-chip (NOC) for switching;

3) the NOC performs column switching for the packets received from the HP module $HP_u$ according to packet control information, and sends the packets to an HP module $HP_v$ of the corresponding vth multi-port component; and 4) the HP module $HP_v$ performs data error correcting, format conversion and channel mapping for the packets received from the NOC, and sends the packets to the port module $PORT_v$ of the vth multi-port component; and the port module $PORT_v$ performs format conversion and protocol processing for the packets, and then sends the packets to a network router (NR) chip or network interface chip of the next level via the high speed SerDes.

Alternatively, the detailed steps of the step 2) comprises: a PCS submodule of the port module $PORT_u$ reorganizes and align the received packets and forwards the packets to a corresponding data LLP submodule $LLP_x$ for processing; the data LLP submodule $LLP_x$ performs coding and error correcting for the packets, and sends the packets to a corresponding port protocol processing logic $HPORT_x$ in the HP module $HP_u$ of the uth multi-port component; and the port protocol processing logic $HPORT_x$ sends the packets to a x*M*P+x*P+sth virtual channel shared buffer over a receiving end virtual channel of the NOC according to number of virtual channels s, wherein x and s are integers, $0 \le x \le M-1$, $0 \le s \le P-1$, and P is a number of the virtual channels for each buffer, that is, each packet can be sent or received from one of the P channels.

The detailed steps of the step 3) comprise: the NOC extracts the packets from the receiving end virtual channel buffer for the column switching, stores the packets in a transmitting end virtual channel buffer of the NOC, extracts the packets from a tth transmitting end virtual channel buffer $VC_t$ and sends the packets to a packet format GB $GB_y$ in the HP module $HP_v$ of the vth multi-port component, wherein t and y are integers, $0 \le t \le M*M*P-1$, $0 \le y \le M-1$, y=t % (M*P), and y is a remainder of t divided by M*P.

The detailed steps of the step 4) comprise: the HP module $HP_v$ performs error correcting and channel mapping for the packets received from the NOC, converts the packets into data LLP packets through $GB_y$ of the yth packet format GB, and sends the packets to the data LLP submodule $LLP_y$ in the port module PORTv of the vth multi-port component; the data LLP submodule $LLP_y$ parses the packets, and sends the packets to the PCS submodule in the port module $PORT_v$; and the PCS submodule reorganizes and aligns the packets, and then sends the packets to the NR chip or network interface chip of the next level via the high speed SerDes.

DESCRIPTION OF THE EMBODIMENTS

Figure 1:
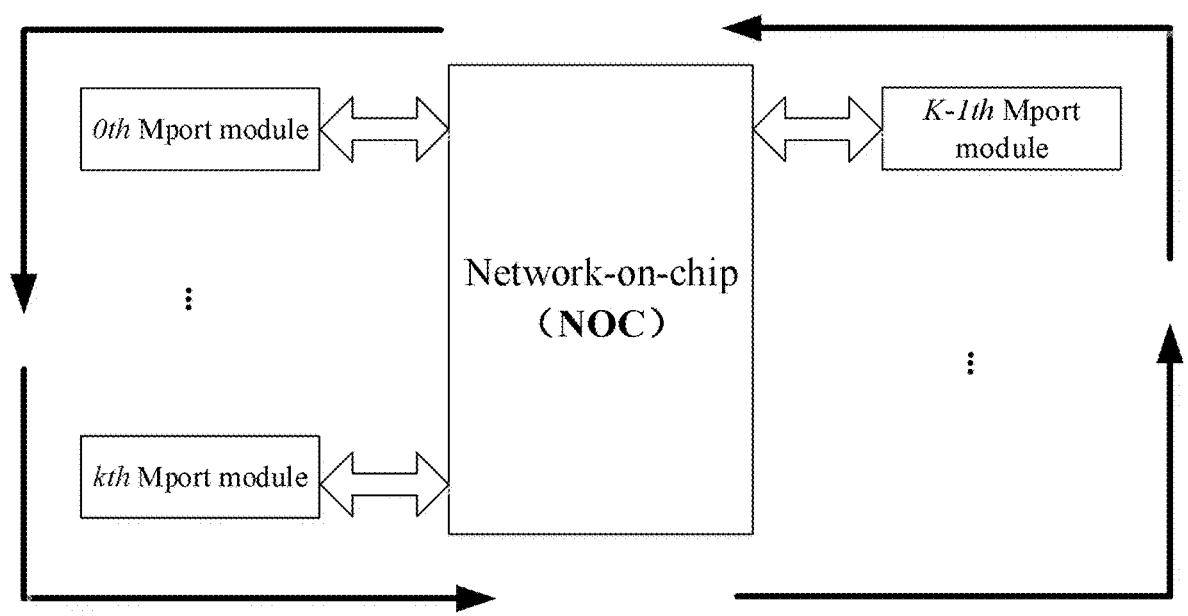
FIG. 1 is a structural diagram of a hierarchical switching fabric in the application of this invention.

As shown in FIG. 1, a hierarchical switching fabric for ultra high radix network routers in this embodiment comprises a network-on-chip (NOC) and K multi-port components configured to converge multiple switching ports (a 0th MPORT module, . . . , a kth MPORT module, . . . , and a K−1th MPORT module). Number of the switching ports of the ultra high radix network router is recorded as N, every M switching ports are converged into a multi-port component, packets of K multi-port components are subject to full switching by a network-on-chip (NOC), the K multi-port components have identical structures, M, N, K and k are integers, M is a factor of N, that is, N can be divided by M exactly, K=N/M, $0 \le k \le K-1$. Packet switching in a network router chip (NR) chip can be divided into two levels: packet switching in the multi-port components and packet switching in the NOC.

Figure 2:
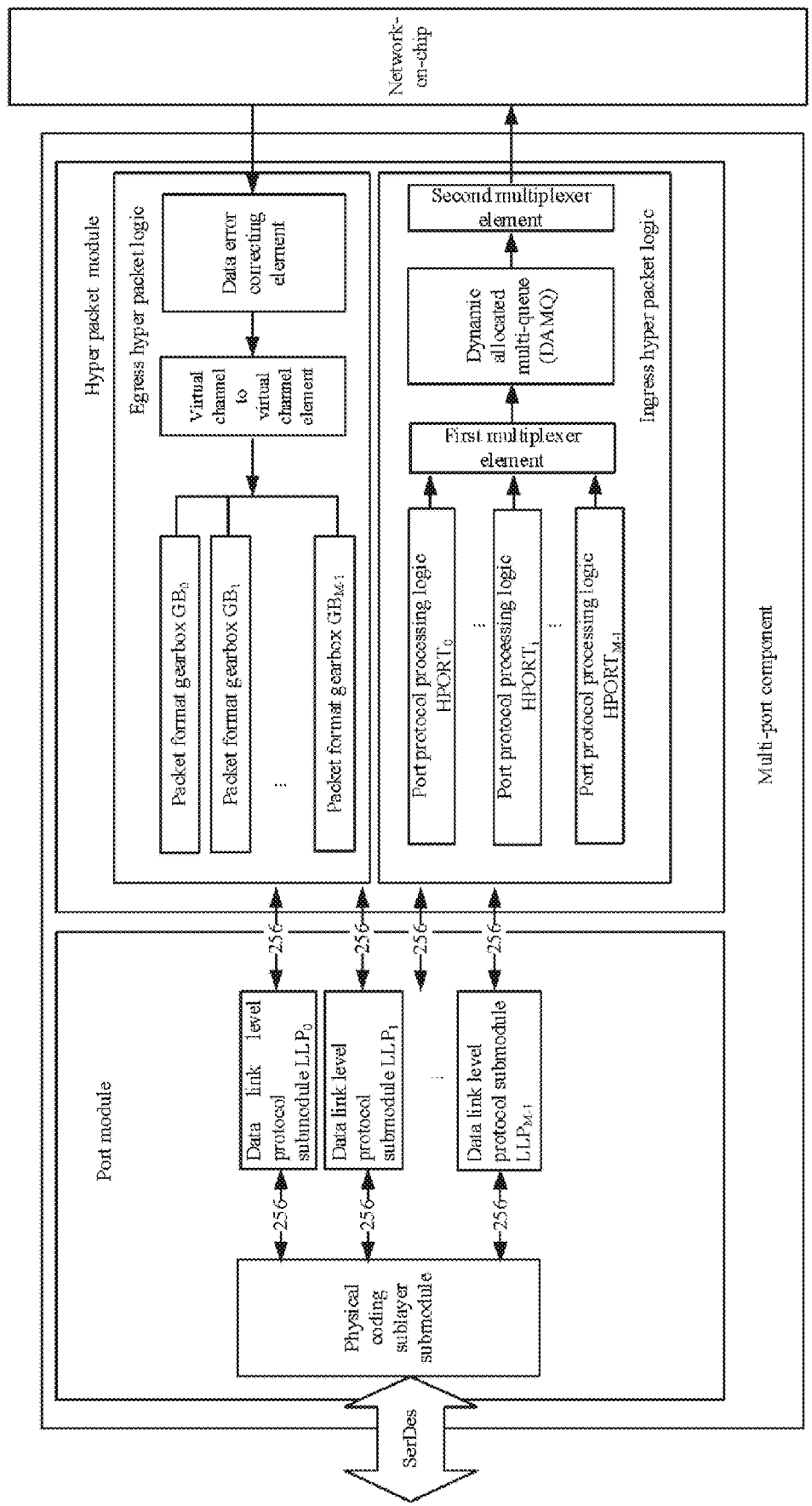
FIG. 2 is a structural diagram of a multi-port component in the application of this invention.

As shown in FIG. 2, the multi-port component comprises:

a port module (PORT module) configured to receive packets from the NOC via a high speed serializer/deserializer (SerDes), encode and format the packets, send the packets to a corresponding hyper packet module (HP module) after coding and format conversion, and send the packets sent by the corresponding HP module to the NOC; and the hyper packet module (HP module) configured to perform protocol processing for the received data link level packets, discard illegal packets, forward legitimate packets to the NOC for switching, perform data error correcting, format conversion and channel mapping for the packets received from the NOC, and send the packets to the corresponding port module.

The port module and the HP module in the kth multi-port component are recorded as $PORT_k$ and $HP_k$ respectively. If the uth multi-port component is an input port and the vth multi-port component is an output port, the port module $PORT_u$ in the uth multi-port component receives packets from the NOC via the high speed SerDes, encodes and formats the packets, and sends the packets to a corresponding HP module $HP_u$ after coding and format conversion. The HP module $HP_u$ performs protocol processing for received data link level packets, discards illegal packets, and forwards legitimate packets to the NOC for switching. The NOC performs column switching for the packets received from the HP module $HP_u$, sends the packets to an HP module $HP_v$ of the corresponding vth multi-port component. The HP module $HP_v$ performs data error correcting, format conversion and channel mapping for the packets received from the NOC, and sends the packets to the port module $PORT_v$. The port module $PORT_v$ performs format conversion and protocol processing for the packets, and then sends the packets to a NR chip of the next level by the high speed SerDes, wherein u and v are integers, $0 \le u \le K-1$, and $0 \le v \le K-1$.

As shown in FIG. 2, the port module comprises physical coding sublayer (PCS) submodules and M data link level protocol (LLP) submodules ($LLP_0$ to $LLP_{M-1}$), the PCS submodules are connected with the NOC via the high speed SerDes, and are respectively connected with the HP modules over the M data LLP submodules ($LLP_0$ to $LLP_{M-1}$), the PCS submodules are configured to align and reorganize packet data, and the data LLP submodules ($LLP_0$ to $LLP_{M-1}$) are configured to perform packet format conversion and protocol processing.

As shown in FIG. 2, the HP module comprises an ingress hyper packet logic (HP_Ingress) and an egress hyper packet logic (HP_Egress). The HP_Ingress is configured to receive data LLP packets from the data LLP submodule of the port module, process high speed packet protocols, perform validity check, partition check, hop number check, channel switching, routing computing and format conversion on the packets, discard illegal packets, make relevant records, and forward the legitimate packets to the NOC for switching, and finally transmit the legitimate packets to the data LLP ports via the NOC and send to the network router chip (NR chip) of the next level. The HP_Egress is configured to receive packets from the NOC, perform error correcting, channel mapping and format conversion for the packets received from the NOC, converts the packets received from the NOC into data LLP packets, and send the packets to the data LLP submodule in the port module.

Figure 3:
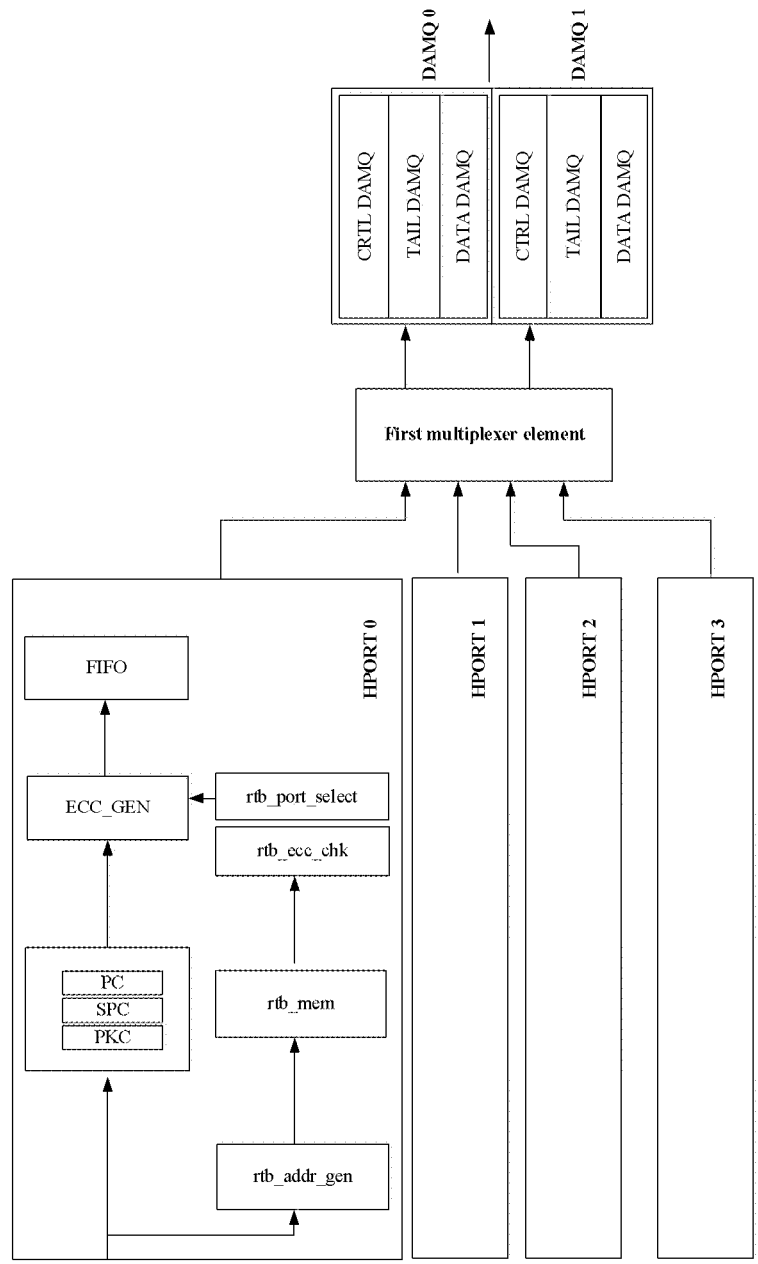
FIG. 3 illustrates the entry protocol processing structure of a hyper packet module (HP module) in the application of this invention.

As shown in FIG. 2 and FIG. 3, the HP_Ingress comprises M identical port protocol processing logics ($HPORT_0$ to $HPORT_{M-1}$), a first multiplexer element (Mux4), a dynamic allocated multi-queue (DAMQ) element and a second multiplexer element (Mux32). $HPORT_i$ represents an ith port protocol processing logic, i is an integer, and $0 \le i \le M-1$.

As shown in FIG. 2 and FIG. 3, the port protocol processing logic comprises a hyper packet (HP) element, a routing computing (RC) element, an error correcting code generator (ECC_GEN) and a first in first out (FIFO) queue buffer. The HP element and the RC element are connected in parallel, and then connected with an input end of the FIFO queue buffer via the ECC_GEN. The packets from the port module are entered into the corresponding port protocol processing logic. The first multiplexer element selects the packets in each of the port protocol processing logics in turn and stores the packets in the DAMQ element, and the second multiplexer element is configured to output the packets stored in the DAMQ element to the NOC.

As shown in FIG. 2 and FIG. 3, the HP_Egress comprises a data error correcting (DEC) element, a virtual channel to virtual channel (VC2VC) element and M identical packet format gearboxes (GB) element, and the packets from the NOC pass through the DEC element and the VC2VC element in turn, and are output to the port module through the packet format GB element.

As shown in FIG. 3, the HP element comprises a packet checking (PC) logic, a partition key checking (PKC) logic and a sequence packet checking (SPC) logic connected in turn. It should be noted that both the PC logic and the PKC logic are to validate format of the packets, while the SPC logic is to check sequence continuity of the packets. Such validation and checking are available in the related art, so they are not repeated here.

As shown in FIG. 3, the RC element comprises a routing address computing logic rtb_addr_gen, a routing address lookup logic rtb_mem, a routing address error correcting logic rtb_ecc_chk and a routing mode selection logic rtb_port_select connected in turn. It should be noted that the routing address computing, the routing address lookup, the routing address error correcting, and the routing mode selection are all routine methods for path processing, so they are not discussed in detail here.

As noted above, the parallel processing mode of HP and RC is used in each port protocol processing logic in this application. Each port protocol processing logic receives the packets from the port module. The HP element and the RC element conduct the HP and the RC in parallel, and then send the legitimate packets and RC results to the ECC correcting logic. The ECC correcting logic protects key packet information, stores packet data information, control information and error correcting information into the FIFO queue buffer of the port protocol processing logic, and then the first multiplexer element circularly reads the data in the FIFO queue buffer of each port protocol processing logic, and stores the data into the buffer of the DAMQ element.

In this application, the DAMQ element is composed of 16-virtual channel shared buffer memories, and every two port protocol processing logics are set to share one 16-virtual channel shared buffer memory. A core clock frequency of the NR chip is recorded as C MHZ, length of the LLP packet is recorded as $W_1$ bits, and width of single DAMQ input data is recorded as $W_2$ bits, the maximum input bandwidth of the LLP is $W_1*C$ bps, and the maximum input bandwidth of the DAMQ is $W_2*C$ bps. C, $W_1$ and $W_2$ are positive integers, and $2*W_1 \le W_2$. In order to avoid network congestion, every two port protocol processing logics are set to share one 16-virtual channel shared buffer memory in this application. The first multiplexer element performs seamless circular priority scheduling of packet slices from different port protocol processing logic combinations to ensure that there is no exception to the FIFO queue buffer inside each port protocol processing logic.

As shown in FIG. 3, each DAMQ element comprises a tail slice DAMQ (TAIL DAMQ) configured to record whether a tail slice arrives and anomaly detection information upon arrival, a control DAMQ (CRTL DAMQ) configured to record head slice information and anomaly detection information (i.e. RC information) upon arrival of the head slice, and a data DAMQ (DATA DAMQ) configured to record data payload and ECC data protection information. Data of the data path is subject to ECC protection in the NR chip, and there are three buffers in the data path, namely input buffer, line buffer and column buffer. All buffers have ECC codes, and are divided into data buffer and control buffer. Values of the line buffer comprises head and tail, virtual channel, line number of destination Tile, destination port number, order-preserving and dimension conversion for arbitration. The data buffer transmits data according to arbitration results. In order to ensure data correctness for the control buffer, every read-write will be subject to ECC correcting operation. For the data buffer, the input buffer is used for ECC coding, and data is read from the column buffer for ECC decoding. ECC coding protection is available for CRTL DAMQ and TAIL DAMQ. However, the DATA DAMQ is subject to ECC computing at an HP input port and sub-ECC correcting at an HP output port. Due to large width of the DATA DAMQ, the DAMQ is divided into TAIL DAMQ, CRTL DAMQ and DATA DAMQ. The DATA DAMQ performs ECC computing at an input port of the HP module and ECC correcting at an output port of the HP module, which is advantageous to protect the data on the whole chip, effectively saving hardware resources and avoiding unnecessary timing critical path.

The first multiplexer element (Mux4) is configured to read a packet from the buffer of the DAMQ element, generate an NOC packet according to the destination port number and virtual channel number of the packet, and send the NOC packet to the NOC for switching. The packet sent to the NOC is subject to line and column switching in the NOC according to control information field selection in the packet, and sends the packet to the corresponding NOC output port to send to other multi-port components in the NR chip.

Figure 4:
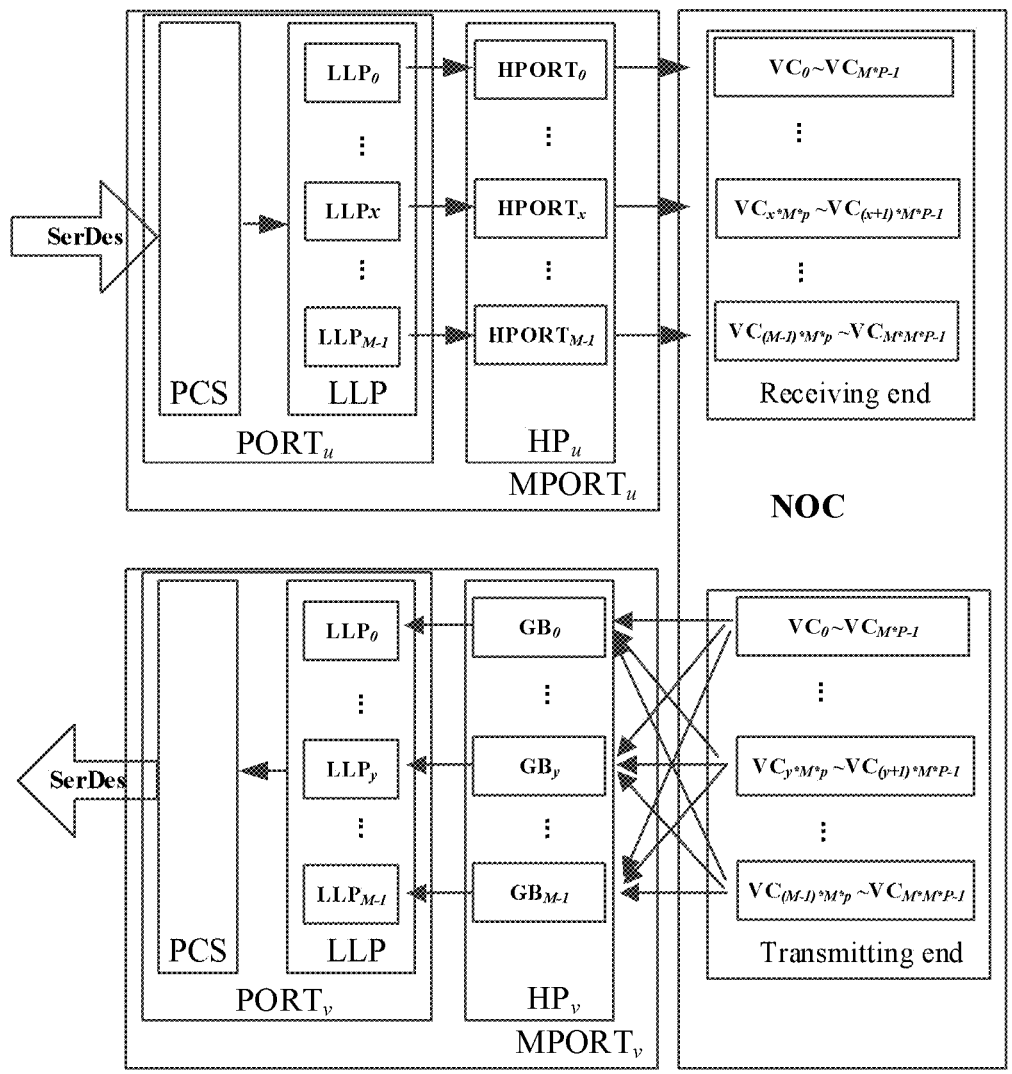
FIG. 4 is a flowchart of a deadlock avoidance method for a network router chip in the application of this invention.

In the NR chip, the packet can be transmitted based on credit control which has advantages of high transmission rate, low transmission delay and no loss of data packets. However, network congestion will occur when load of a switching node or destination node exceeds the maximum processing capacity of the network, resulting in chip deadlock, thus reducing overall performance of the network. In order to realize deadlock-free packet switching of N ports, this application further provides a deadlock avoidance method using the hierarchical switching fabric for the hyper packet (HP) in a network router (NR) chip and deadlock-free switching in a network-on-chip (NOC), and avoidance of deadlock problem resulting from data congestion in the NR chip. As mentioned above, there are M switching ports in each HP module and M data link level protocol (LLP) submodules in each port module. Network packets are transmitted over P VCs, M*M*P receiving end VC buffers and transmitting end VC buffers are set in the NOC, and P is a positive integer. As shown in FIG. 4, the deadlock avoidance method used for a hierarchical switching fabric for ultra high radix network routers are implemented as follows:

1) a port module $PORT_u$ of a uth multi-port component receives packets from a network via a high speed serializer/deserializer (SerDes);

2) the port module $PORT_u$ encodes and converts format of the packets and sends the packets to a hyper packet (HP) module $HP_u$ of the uth multi-port component; The HP module $HP_u$ performs protocol processing for received data link level packets, discards illegal packets, and forwards legitimate packets to the NOC for switching;

3) the NOC performs column switching for the packets received from the HP module $HP_u$ according to packet control information, and sends the packets to an HP module $HP_v$ of the corresponding vth multi-port component; and 4) the HP module $HP_v$ performs data error correcting, format conversion and channel mapping for the packets received from the NOC, and sends the packets to the port module $PORT_v$ of the vth multi-port component; and the port module $PORT_v$ performs format conversion and protocol processing for the packets, and then sends the packets to a network router (NR) chip or network interface chip of the next level via the high speed SerDes.

In this application, step 2) is detailed as follows: a PCS submodule of the port module $PORT_u$ reorganizes and align the received packets and forwards the packets to a corresponding data LLP submodule $LLP_x$ for processing; the data LLP submodule $LLP_x$ performs coding and error correcting for the packets, and sends the packets to a corresponding port protocol processing logic $HPORT_x$ in the HP module $HP_u$ of the uth multi-port component; and the port protocol processing logic $HPORT_x$ sends the packets to a x*M*P+x*P+sth virtual channel shared buffer over a receiving end virtual channel of the NOC according to number of virtual channels s, wherein x and s are integers, $0 \leq x \leq M-1$, $0 \leq s \leq P-1$, P is a number of the virtual channels for each buffer, that is, each packet can be sent or received from one of the P channels.

In this application, step 3) is detailed as follows: the NOC extracts the packets from the receiving end virtual channel buffer for the column switching, stores the packets in a transmitting end virtual channel buffer of the NOC, extracts the packets from a tth transmitting end virtual channel buffer $VC_t$ and sends the packets to a packet format GB $GB_y$ in the HP module $HP_v$ of the vth multi-port component, wherein t and y are integers, $0 \leq t \leq M*M*P-1$, $0 \leq y \leq M-1$, y=t % (M*P), and y is a remainder of t divided by M*P.

In this application, step 4) is detailed as follows: the HP module $HP_v$ performs error correcting and channel mapping for the packets received from the NOC, converts the packets into data LLP packets through $GB_y$ of the yth packet format GB, and sends the packets to the data LLP submodule $LLP_y$ in the port module $PORT_v$ of the vth multi-port component. The data LLP submodule $LLP_y$ parses the packets, and sends the packets to the PCS submodule in the port module $PORT_v$; and the PCS submodule reorganizes and aligns the packets, and then sends the packets to the NR chip or network interface chip of the next level by the high speed SerDes.

The technical problem to be solved by this invention is to provide a hierarchical switching fabric for ultra high radix network routers and a deadlock avoidance method in view of characteristics of the ultra high radix network router in the related art such as occupation of too much network resources due to excessive switching ports, much switching delay and insufficient buffer resources (which may lead to chip deadlock). The invention can improve network switching efficiency, reduce packet switching delay, and effectively avoid deadlock problem in packet switching in the ultra high radix network routers, and can be widely used in super advanced chip design.

Compared with the related art, this invention has the following advantages:

1. A two-level switching fabric composed of multi-port components and the NOC are arranged in the ultra high radix network router; The switching in the multi-port components uses parallel processing of hyper packet and routing computing. The hyper packet can be completed in one clock cycle, and the routing computing can be completed in three clock cycles. The design of this invention can realize the parallel execution of the hyper packet and the routing computing, effectively reduce length of timing path of packet protocol parsing, and save hardware resources.

2. This invention can realize deadlock-free switching in the multi-port components and the NOC in the network switching, avoid deadlock caused by data congestion in NR chips, and realize high-bandwidth and low-delay data transmission of network packets in NR chips.

The above are only preferred applications of this invention, and the protection scope of this invention is not limited to the applications mentioned above. All the technical solutions with the ideas of this invention fall into the protection scope of this invention. It should be pointed out that, for an ordinary person skilled in the art, some improvements and modifications without deviating from the principle of this invention shall be deemed as the protection scope of this invention.

What is claimed is:

1. A hierarchical switching fabric for ultra high radix network routers, comprising: a network-on-chip and K multi-port components configured to converge multiple switching ports;
the K multi-port components, each of the K multi-port components comprise a port module and a hyper packet module;
the port module of the Kth multi-port components configured to receive packets from the network-on-chip over a high speed serializer/deserializer, encode and format the packets, send the packets to the corresponding hyper packet module after coding and format conversion, and send the packets to the module to the network-on-chip; and
the hyper packet module configured to perform protocol processing for the received data link level packets, discard illegal packets, forward legitimate packets to the network-on-chip for switching, perform data error correcting, format conversion and channel mapping for the packets received from the network-on-chip, and send the packets in which data error correcting, format conversion, and channel mapping has been performed to the corresponding port module.

2. The hierarchical switching fabric for ultra high radix network routers as recited in claim 1, wherein the port module of the Kth multi-port components comprises physical coding sublayer submodules and M data link level protocol submodules;
the physical coding sublayer submodules are connected with the network-on-chip via the high speed serializer/deserializer, and are respectively connected with the hyper packet module via the M data link level protocol submodules, and the physical coding sublayer submodules are configured to align and reorganize packet data, and
the M data link level protocol submodules are configured to perform packet format conversion and protocol processing.

3. The hierarchical switching fabric for ultra high radix network routers as recited in claim 2, wherein the hyper packet module of the Kth multi-port components comprises an ingress hyper packet logic and an egress hyper packet logic;
the ingress hyper packet logic comprises M identical port protocol processing logics, a first multiplexer element, a dynamic allocated multi-queue element and a second multiplexer element;

the port protocol processing logic comprises a hyper packet element, a routing computing element, an error correcting code generator, and a first in first out queue buffer;
the hyper packet element and the routing computing element are connected in parallel, and then connected with an input end of the first in first out queue buffer via the error correcting code generator; the packets from the port module are entered into the corresponding port protocol processing logic;
the first multiplexer element selects the packets in each of the port protocol processing logics in turn and stores the selected packets in the dynamic allocated multi-queue element, and the second multiplexer element is configured to output the packets stored in the dynamic allocated multi-queue element to the network-on-chip.

4. The hierarchical switching fabric for ultra high radix network routers as recited in claim 3, wherein the egress hyper packet logic comprises a data error correcting element, a virtual channel to virtual channel element, and M identical packet format gearboxes;
the packets from the network-on-chip pass through the data error correcting element and the virtual channel to virtual channel element, and then output to the port module through the packet format gearboxes.

5. The hierarchical switching fabric for ultra high radix network routers as recited in claim 3, wherein the hyper packet element comprises a packet checking logic, a partition key checking logic and a sequence packet checking logic successively connected.

6. The hierarchical switching fabric for ultra high radix network routers as recited in claim 3, wherein the routing computing element comprises a routing address computing logic, a routing address lookup logic, a routing address lookup logic, routing address error correcting logic and a routing mode selection logic successively connected.

7. The hierarchical switching fabric for ultra high radix network routers as recited in claim 3, wherein the dynamic allocated multi-queue element consists of 16-virtual channel shared buffer memories, and every two port protocol processing logics are set to share one 16-virtual channel shared buffer memory.

8. The hierarchical switching fabric for ultra high radix network routers as recited in claim 3, wherein each dynamic allocated multi-queue element comprises
a tail slice dynamic allocated multi-queue configured to record whether a tail slice arrives and anomaly detection information upon arrival;
a control dynamic allocated multi-queue, that is routing computing information, configured to record head slice information and anomaly detection information upon arrival of the head slice; and
a data dynamic allocated multi-queue configured to record data payload and error correcting code data protection information.

9. A deadlock avoidance method for the hierarchical switching fabric for ultra high radix network routers, comprising:
receiving, through a port module $PORT_u$ of a uth multi-port component, packets from a network-on-chip via a high speed serializer/deserializer;
encoding and converting, through the port module $PORT_u$, format of the received packets and sending the packets to a hyper packet module $HP_u$ of the uth multi-port component after coding and format conversion; and performing, through the hyper packet module $HP_u$, protocol processing for received data link level packets, discarding illegal packets, and forwarding legitimate packets to a network-on-chip for switching;

performing, through the network-on-chip, column switching for the packets received from the hyper packet module $HP_u$ according to packet control information, and sending the packets to a corresponding hyper packet module $HP_v$ of a vth multi-port component after performing column switching; and performing, through the hyper packet module $HP_v$, data error correcting, format conversion and channel mapping for the packets received from the network-on-chip, and sending the packets in which data error correcting, format conversion, and channel mapping has been performed to a port module $PORT_v$ of the vth multi-port component; and performing, through the port module $PORT_v$, format conversion and protocol processing for the packets, and then sending the packets in which format conversion and protocol processing has been performed to a network router chip or network interface chip of a next level via the high speed serializer/deserializer.

10. The deadlock avoidance method as recited in claim 9 for the hierarchical switching fabric for ultra high radix network routers, wherein encoding and converting, through the port module $PORT_u$, format of the received packets and sending the packets to a hyper packet module $HP_u$ of the uth multi-port component after coding and format conversion; and performing, through the hyper packet module $HP_u$, protocol processing for received data link level packets, discarding illegal packets, and forwarding legitimate packets to a network-on-chip for switching, comprising:

reorganizing and aligning, through physical coding sublayer submodules of the port module $PORT_u$, the received packets and forwarding the reorganized and aligned packets to corresponding data link level protocol submodules $LLP_x$ for processing;

performing, through the data link level protocol submodules $LLP_x$, coding and error correcting for the packets received from the physical coding sublayer submodules, and sending the packets in which coding and error correcting has been performed to a corresponding port protocol processing logic $HPORT_x$ in the hyper packet module $HP_u$ of the uth multi-port component; and sending, through the port protocol processing logic $HPORT_x$, the packets received from the data link level protocol submodules $LLP_x$ to a x*M*P+x*P+sth virtual channel shared buffer over a receiving end virtual channel of the network-on-chip according to number of virtual channels s, wherein x and s are integers, $0 \le x \le M-1$, $0 \le s \le P-1$, and P is a number of the virtual channels for each buffer, wherein, each packet is sent or received from one of the virtual channels.

11. The deadlock avoidance method as recited in claim 9 for the hierarchical switching fabric for ultra high radix network routers, wherein performing, through the network-on-chip, column switching for the packets received from the hyper packet module $HP_u$ according to packet control information, and sending the packets to a corresponding hyper packet module $HP_v$ of the vth multi-port component after performing column switching, comprising: extracting, through the network-on-chip, the packets from the receiving end virtual channel buffer for the column switching, storing the extracted packets in a transmitting end virtual channel buffer of the network-on-chip, extracting the packets from a tth transmitting end virtual channel buffer $VC_t$ and sending the extracted packets from the tth transmitting end virtual channel buffer $VC_t$ to a packet format gearboxes $GB_y$ in the hyper packet module $HP_v$ of the vth multi-port component, wherein t and y are integers, $0 \le t \le M*M*P-1$, $0 \le y \le M-1$, y=t % (M*P), and y is a remainder of t divided by M*P.

12. The deadlock avoidance method as recited in claim 9 for the hierarchical switching fabric for ultra high radix network routers, wherein performing, through the hyper packet module $HP_v$, data error correcting, format conversion and channel mapping for the packets received from the network-on-chip, and sending the packets in which data error correcting, format conversion, and channel mapping has been performed to the port module PORTv of the vth multi-port component; and performing, through the port module $PORT_v$, format conversion and protocol processing for the packets, and then sending the packets in which format conversion and protocol processing has been performed to a network router chip or network interface chip of the next level via the high speed serializer/deserializer, comprising:

performing, through the hyper packet module $HP_v$, error correcting and channel mapping for the packets received from the network-on-chip, converting the packets in which error correcting and channel mapping has been performed into data link level protocol packets through the yth packet format gearboxes $GB_y$, and sending the data link level protocol packets to a data link level protocol submodule $LLP_y$ in the port module $PORT_v$ of the vth multi-port component;

parsing, through the data link level protocol submodule $LLP_y$, the received data link level protocol packets, and sending the parsed packets to a physical coding sublayer submodule in the port module $PORT_v$; and reorganizing and aligning, through the physical coding sublayer submodule, the packets received from the physical coding sublayer submodule, and then sending the reorganized and aligned packets to the network router chip or network interface chip of the next level via the high speed serializer/deserializer.

* * * * *